United States Patent [19]
Woods

[11] Patent Number: 5,098,301
[45] Date of Patent: Mar. 24, 1992

[54] MULTIPLICATION FACTS LEARNING AID

[76] Inventor: Kenneth C. Woods, Rte. 1, Box 106-AAA, Wellington, Mo. 64097

[21] Appl. No.: 539,922

[22] Filed: Jun. 18, 1990

[51] Int. Cl.$^5$ ................................................ G09B 1/00
[52] U.S. Cl. ..................................... 434/195; 434/208; 434/209
[58] Field of Search ............... 434/188, 195, 205, 208, 434/209; 273/153 S

[56] References Cited

U.S. PATENT DOCUMENTS

| | | |
|---|---|---|
| 1,305,724 | 11/1918 | Kennedy . |
| 1,836,870 | 12/1931 | Quer . |
| 2,635,355 | 4/1953 | Thompson et al. . |
| 2,663,096 | 12/1953 | McCurdy . |
| 2,901,839 | 9/1959 | Huff .............................. 434/208 |
| 3,002,295 | 10/1961 | Armstrong ..................... 434/195 |
| 3,094,792 | 6/1963 | Morgan et al. ................ 434/195 |
| 3,204,343 | 9/1965 | Pollock . |
| 3,229,388 | 1/1966 | Smith . |
| 3,311,996 | 4/1967 | Bergener . |
| 3,414,986 | 12/1968 | Stassen . |
| 4,505,682 | 3/1985 | Thompson ..................... 434/205 |
| 4,518,359 | 5/1985 | Yao-Psong .................... 434/195 |
| 4,548,585 | 1/1986 | Kelly . |
| 4,645,461 | 2/1987 | Mortensen .................... 434/188 |
| 4,838,794 | 1/1988 | Coddington . |

FOREIGN PATENT DOCUMENTS

| | | | |
|---|---|---|---|
| 1525736 | 4/1968 | France ............................ 434/195 |
| 422472 | 6/1947 | Italy ............................... 434/208 |
| 919025 | 2/1963 | United Kingdom ........... 434/195 |

Primary Examiner—Richard J. Apley
Assistant Examiner—Rachel M. Healey
Attorney, Agent, or Firm—Litman, McMahon & Brown

[57] ABSTRACT

A multiplication facts learning aid kit comprises a model amenable to computerization, teachers manual, set flash cards, and student materials to enable the learner to know the multiplication facts without rote memory.

The model comprises a base and a plurality of square prismatic blocks with impressions of cubical units being proportionally-graduated squares up to the square of each numeral through twelve with the first cubic block being 1 cubed while the remaining plies represent integral multiples of the dimensions of said first block. Each composite multiple segmented ply represents multiplication facts in which multipliers are consistently the smaller numeral or are of the same value as the multiplicand. The width and height of the plies increase proportionally as the numeral affixed to the frontal surface corresponds to the value of that multiplication fact.

Plies may be positioned to identify pattern relationships between sets of multiplication facts. Lateral manipulation of the appropriate ply enables the user to see, feel, and count representative blocks for each multiplication fact through 12 squared.

9 Claims, 3 Drawing Sheets

MULTIPLICATION FACTS LEARNING AID

BACKGROUND OF THE INVENTION

This invention relates to a visual and manipulative teaching aid kit used therewith to teach multiplication facts without rote memory.

There are several utility patents which utilize graduated rectangular and prismatic blocks as educational aids and teaching toys. The prior art provides visual and manipulative components that could benefit learners and teachers of mathematical enumeration, concepts and relationships. Some components of the art limit their contribution to one, or a few, uses while other inventions are presented as complete mathematical programs.

Kennedy, U.S. Pat. No. 1,305,724 proposed a visual teaching aid of a plurality of blocks which would increase or decrease in relation to a designated decimal-point block. This aid was limited to decimal-point concepts.

Quer, U.S. Pat. No. 1,836,870 proposed a game of interfitting blocks with numerical representations which would total ten when correctly placed in preset compartments of the games base. This game was limited to concepts totaling ten.

Thompson, et al., U.S. Pat. No. 2,635,355 proposed an "Education enumeration block assembly" in which the set of blocks are scored into unit divisions indicating the appropriate value and numeral to ten. The meaning of the numbers to ten also limits the value of this invention.

McCurdy, U.S. Pat. No. 2,663,096 proposed a set of ten square prismatic blocks of cubic units slotted according to the cardinal numeral each represented to serve as an "educational toy." An accompanying rectangular check sheet necessitated a horizontal enumeration of the said units. The concept of how many extends only to ten.

Pollock, U.S. Pat. No. 3,204,343 proposed a studying and teaching aid set of multicolored elements of graduated lengths in which selected elements were of the same primary color but in different intensities. The increasing lengths were limited to ten.

Smith, U.S. Pat. No. 3,229,388 proposed a teaching aid of rectangular blocks ranging from one to ten varying in length, arranged within a said box. The combination of numerals were limited to those totaling ten.

Bergener, U.S. Pat. No. 3,311,996 proposed a kinesthetic teaching aid of multicolored units of stairstep appearance ascending from one through ten as a teaching aid whereby the student physically ascends the steps. The graduated units did not extend beyond ten.

Stassen, U.S. Pat. No. 3,414,986 proposed another teaching aid of numbered blocks of cubic size proportional to the cardinal numerals to be mounted on a rectangular base. The blocks could be arranged to teach the concept of sets of numbers. The value of the sets was limited to ten.

Kelly, U.S. Pat. No. 4,548,585 proposed a combination of shapes and colors signifying positive and negative numbers to illustrate numbers to ten. The program may be used to teach sums and differences over ten but fails to provide specific multiplication facts attainment experiences.

Coddington, U.S. Pat. No. 4,838,794 proposed a metric block toy comprising a set of cubic blocks of ten centimeters square having legends indicating length, volume and mass. The invention is limited to metric system concepts.

Heretofore, prior art has failed to propose a set of graduated blocks with cubical units representing the products on which these multiplication facts, as well as an equal number of concrete objects, could be pictured and manipulated by students and teachers. None of the patents propose a teaching aid enabling the relationship within and between the factors and the products for an entire set to be known efficiently and without memorization.

Prior to this invention teachers have assigned repetitious rote memory training activities as the way for students to learn and know the multiplication facts. Many teachers, if not most, prefer meaningful, concept formation skills and knowledge to be attained through analysis and synthesis rather than just memorization.

OBJECTS AND ADVANTAGES OF THE INVENTION

It is the summative object of the present invention to provide a visual, manipulative, and computer adaptable model multiplication facts learning program in kit form.

One object of the present invention is to provide a plurality of plies bearing appropriate block designations to visually represent the number of cubic blocks of any multiplication fact.

Another object of this invention is to provide a multiplication model that enables students to identify one relationship or pattern concept for knowing each multiplication fact within a set rather than one factor combination at a time.

Another object of this invention is to provide a multiplication facts model with which teachers could readily use thinking skills such as analysis and synthesis as well as meaningful reception learning and concept formation theories to teach the multiplication facts through the twelves.

Another object of this invention is to provide a multiplication model where the smaller or larger factor in problems can determine the concept that enables each student to know all the remaining facts in each set, thereby reducing the number of facts to be known for the final set to only one and the next to last set to only two.

Another object of this invention is to provide a visual and manipulative teaching aid in which computer program visuals and the concrete model would be identical in operation.

The above noted objects and additional objects are attained by use of a manipulative learning aid and accompanying materials including teachers manual, students booklet, worksheets, computer program and set flash cards.

DETAILED DESCRIPTION OF THE INVENTION

Figure 1:
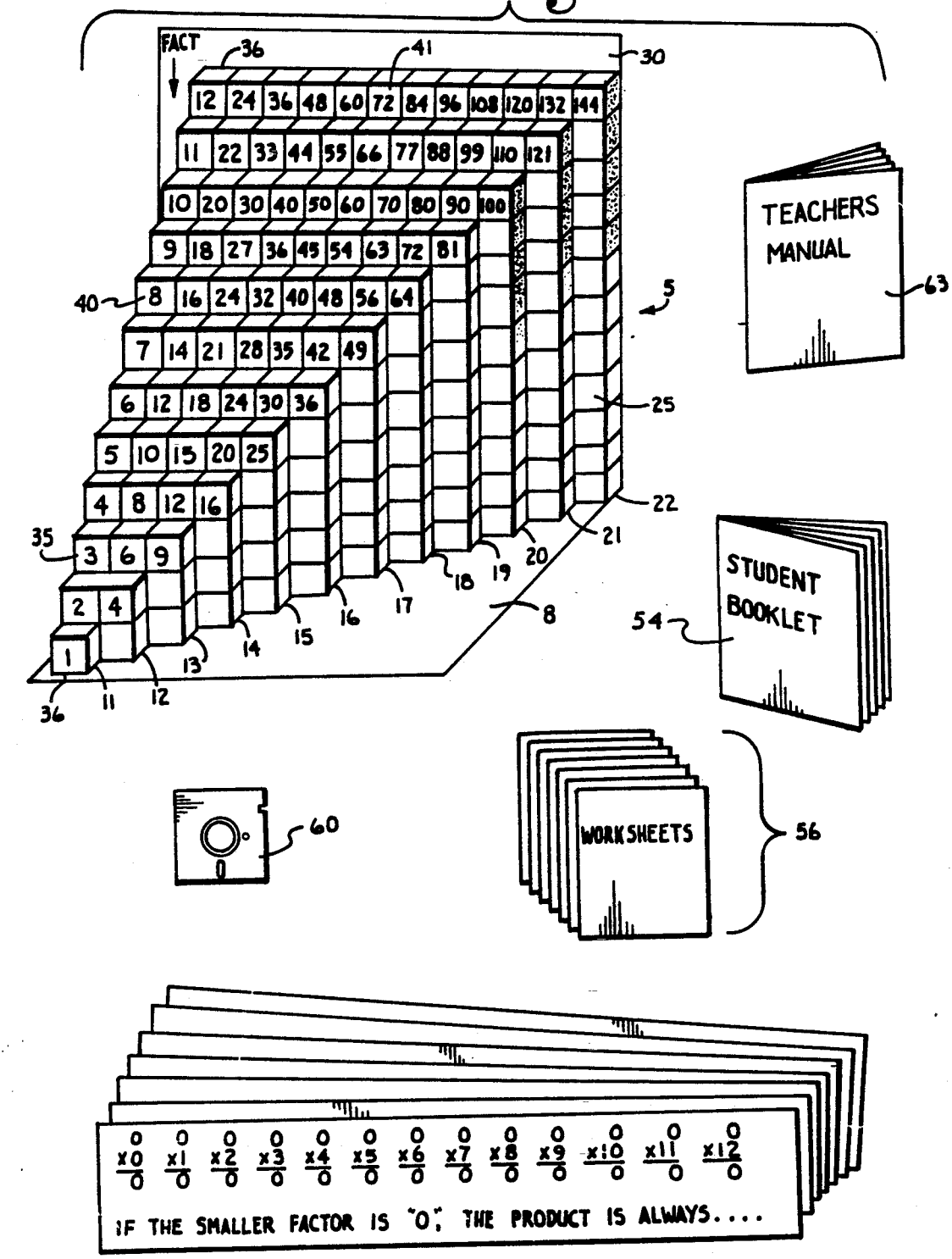
FIG. 1 is an isometric view of the present invention in kit form including a manipulative learning aid comprising a plurality of square plies.

Referring to the drawings by number of reference, and more particularly to FIG. 1, there is shown a preferred embodiment of the invention in kit form. The teaching components may be boxed separately in keeping with their varied shapes and dimensions. The teaching components include a manipulative learning aid 5. The manipulative learning aid 5 comprises a set of twelve square plies 7 which are positioned or supported on a base 8. The plies 7 may be of plastic, styrofoam, cardboard, wood, or the like.

Each of the plies 7 represents one of the consecutive whole numerals from one to twelve such that a first ply 11 represents the numeral one, a second ply 12 represents the numeral two, a third ply 13 represents the numeral three, a fourth ply 14 represents the numeral four, a fifth ply 15 represents the numeral five, a sixth ply 16 represents the numeral six, a seventh ply 17 represents the numeral seven, an eighth ply 18 represents the numeral eight, a ninth ply 19 represents the numeral nine, a tenth ply 20 represents the numeral ten, an eleventh ply 21 represents the numeral eleven and a twelfth ply 22 represents the numeral twelve.

Each of the plies 7 is formed from a number of uniformly sized cubical units 25 equal to the square of the numeral represented by that ply 7. The cubical units 25 are arranged in a number of rows and columns equal to the numeral represented by the respective ply 7 such that each ply 7 is square. For example, the fourth ply 14 representing the numeral four is formed from sixteen cubical units 25 arranged in four columns of four cubical units 25 and four rows of four cubical units 25. The plies 7 are arranged on the base 8 one behind the other in consecutive order such that the first ply 11 is positioned near the front of the base 8 and the twelfth ply 22 is positioned at the rear of the base in abutting relationship with a rear wall 30 which extends perpendicular to the base 8 at a rear portion thereof. The plies 7 are further arranged on the base 8 such that a leftmost or outermost edge 35 of a first column 36 of each of the plies 7 is linearly aligned with the leftmost edges 35 of the first columns 36 of the other plies 7.

Numeric indicia 40 are printed on an outer face 41 of the uppermost cubical units 25 in each of the columns of each of the plies 7. The numeric indicia 40 printed in a particular cubical unit 25 corresponds to the product obtained by multiplying the numeral represented by the respective ply 7 by the number equal to the number of columns that the column containing the cubical unit containing the respective numeric indicia is spaced away from the leftmost edge 35 of the first column 36. For example, in the uppermost cubical unit 25 of the eighth ply 18, the numeric indicia printed in the cubical unit 25 located in the second column away from the leftmost edge 35 of the first column 36 is the numeral sixteen which corresponds to eight multiplied by two.

Figure 2:
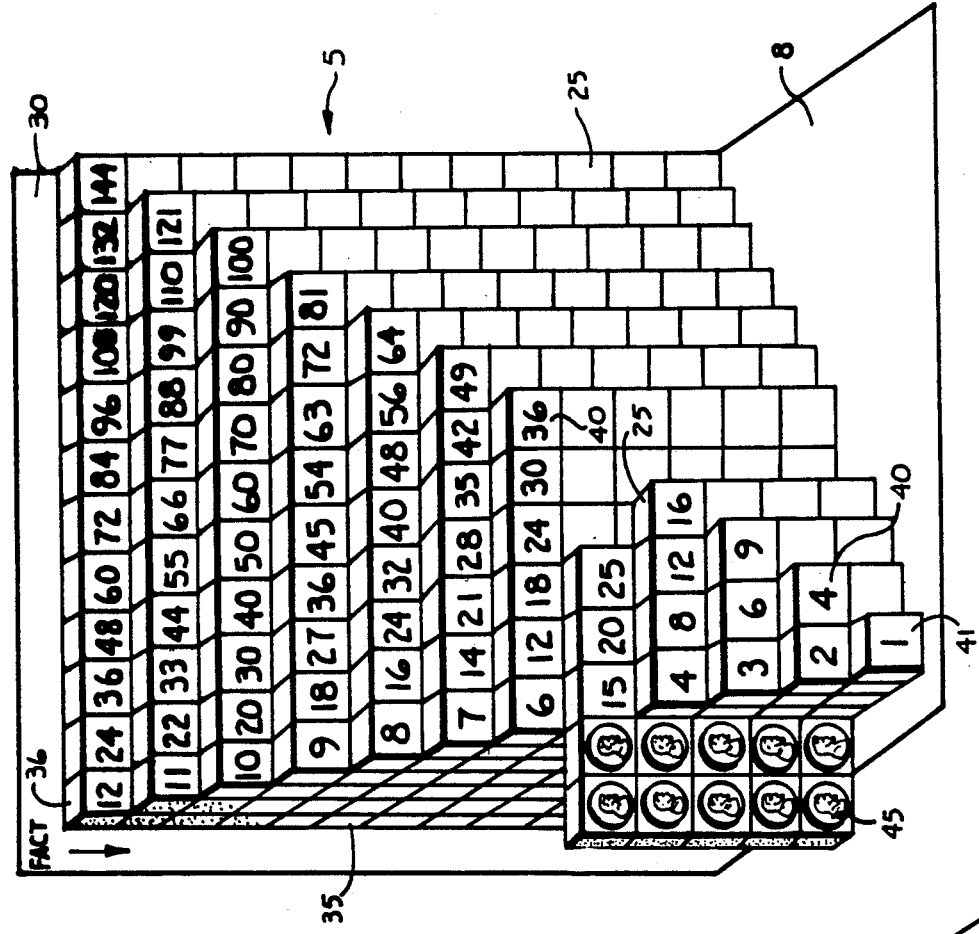
FIG. 2 is a perspective view of the manipulative learning aid showing how the plies may be manipulated to assist in learning multiplication facts.

The plies 7 are laterally advanceable with respect to one another as shown in FIG. 2. The ability to advance the plies 7 laterally with respect to one another assists a user in learning particular multiplication facts. A multiplication fact is the product obtained from the multiplication of a particular number by another number. In using the manipulative learning aid 5 to learn a particular multiplication fact such as five multiplied by two, the user laterally advances the fifth ply 15 two columns to the left such that two of the columns of the fifth ply 15 extend beyond the leftmost edge 35 of the other plies 7. As seen in FIG. 2, the user can then visualize the multiplication fact in that two sets of five cubical units 25 is equal to ten which corresponds to the numeric indicia 40 printed in the uppermost cubical unit 25 in the second column.

Figure 3:
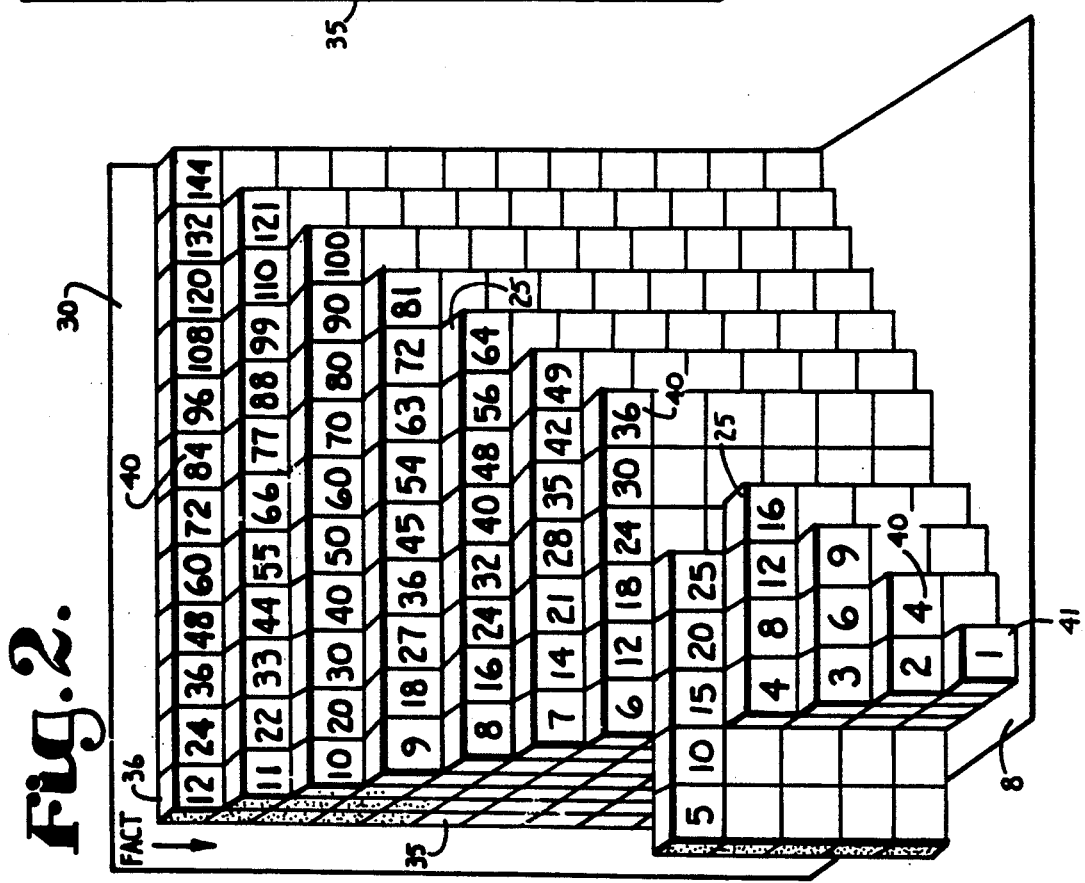
FIG. 3 is a perspective view of the manipulative learning aid having visual representations of concrete objects selectively added to faces of selected cubical units forming each ply and showing how the plies may be manipulated.
Figure 4:
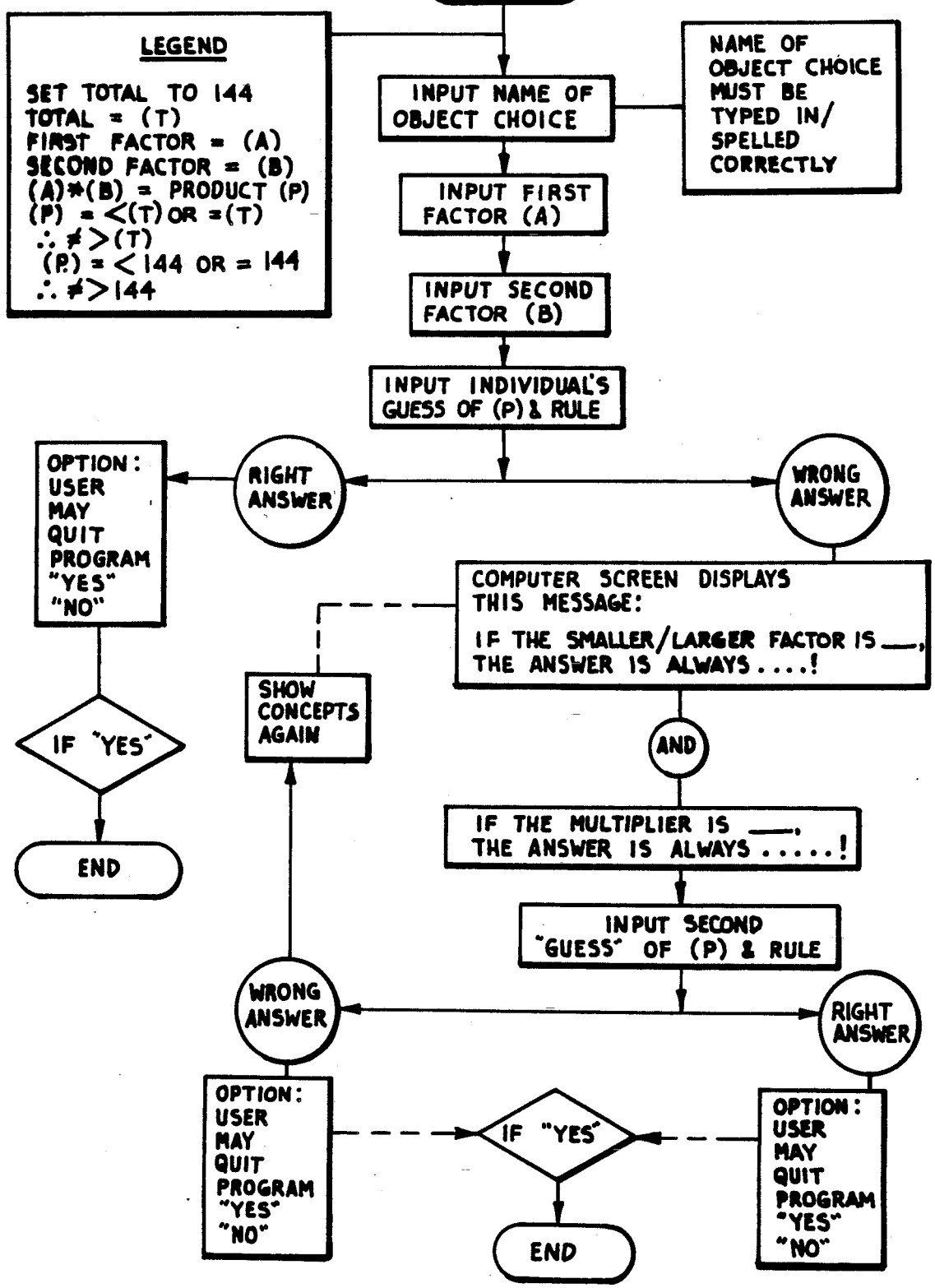
FIG. 4 is a flow chart of an accompanying computer program.

As shown in FIG. 3, a visual representation of a concrete object 45 may be added to the face of each cubical unit 25 laterally advanced to the left along with a ply 7 to illustrate how many in concrete concepts rather than abstract terms alone.

The teaching components also comprise a series of seven rectangular set flash cards 50 having each combination of factors from 0 through 12. For each set one or more relational or pattern concept between the factors and products are highlighted by form, color, size or intensity of print within each set. This makes it much easier for the learner to achieve concept formation as it relates to the set being analyzed. The set flash cards 50 for classroom viewing are approximately eight inches by forty-eight inches while student set flash cards 50 are approximately three inches by eleven inches.

The teaching components include a student booklet 54 for independent acquisition of each set concept with special instructions for parent who ar likely to be unfamiliar with concept formation procedures and the advantages over memorization of the facts.

The teaching component of student worksheets 56 may be used for guided or independent practice. The worksheet problems are only a part of the concept of how many. Each factor is followed by meaningful words requiring the learner to identify the concrete products as well as how many. The learner must express in writing to the right of the problems the concept that enabled him to know the product.

The teaching component of a computer program as symbolically represented by a floppy disc 60 may be likewise be used for guided or independent practice. The display of the computer program incorporates visual representations of the concrete objects 45 on each cubical unit 25 of the appropriate ply 7. The student will input both factors, the items to be counted, and select a pattern or relational concept that enabled him to know the answer.

The kit further includes a teachers manual 63 for instructing teachers in higher thinking skills, meaningful reception learning, concept formation steps and task analysis. The manual 63 also provides the teacher with modeling, guided practice and independent practice preferred procedures.

In using the components comprising the present invention, the instructor will model, or have to be modeled, the various plies 7 in relation to each other in order that the cubic size proportional to the fact, convey visually the relationship of quantities, mass and numerals.

The following lesson is presented to illustrate the relationship of the components of the invention with the learners use of analysis and synthesis thinking skills, meaningful reception learning and concept formation steps.

Lesson FIVES is an introduction to the fives as the common factor in combination with each of the other prime numbers. Referring now to FIG. 2 and FIG. 3 location of the plies 7 representing the numerals ten and five are reviewed by the instructor. The learner may be asked to enumerate the series counting of the sets, identify sums that are the same and/or identify totals that are different. While identifying similarities and differences the learner is instructed to think in terms of money in order to achieve association concepts in relation to the tens and fives.

Beginning with $1.00 coinage, one-half the value of other coins may be demonstrated with emphasis that any fives group of any numeral are one-half the amount of tens group of that same value. A relational concept between any multiplication problem in which one of the factors is a five and the other factors ten fact may be attained by the learner. Attainment of this relational concept enables the learner to instantaneously respond with the correct abstract numeral when confronted with a need to know the product of any fives set.

A pattern concept may also be attained and utilized by the learner beginning with a review of the family of the tens and the tens column in the answers where the other number always appears. Review of the meaning of the ones column, as well as the tens column, may increase the meaningfulness of pattern identification. The attention of the learners is first directed to the even numbered factor in any fives problem. The answer in the tens column may be seen as one-half of the other number when the pattern between the answers and the other factor are visually, tactically and auditorilly demonstrated. Half of a one in the tens column which would result in a five in the ones column may be demonstrated with the addition of two fives or dividing ten or thirty items into one-half size groups and determining how many are now in each group. The other factors that are odd factors in the fives family may then be taught as resulting in a five numeral in the ones column while the tens column numeral is the next lowest numeral of one-half of that odd factor.

It will be seen from the above system, that the various facts can be known in a concrete and clear manner as the relationships of cubic size are continuously observable by the learner as the concepts are deduced.

Although this invention has been described in preferred form, it should be understood that various modifications may be incorporated within the scope of the following claims..

I claim:

1. A kit of materials for teaching multiplication facts comprising an open base and a plurality of square plies set one in front of the other on said base and laterally shiftable to the left on said base, each of said square plies corresponding to a different numeral from a consecutive set of numerals and including numeric indicia means corresponding to said numeral with which the ply is associated, and each of said square plies having a total number of cubical units corresponding to the square of its associated numeral wherein each successive ply is graduated in height and width whereby a user may view and manipulate said square plies relative to each of the other square plies to increase the user's understanding of multiplication and relationships of numbers.

2. The kit of materials according to claim 1 further including:

(a) a teachers' manual for instructing teachers in the application and use of said kit;
(b) a students' manual for attaining relational and pattern concepts within each set of said multiplication facts;
(c) a set of printed worksheets combining computational exercises with one or more of the relational or pattern concepts that enables a student to learn a specific one of said multiplication facts.

3. The kit of materials according to claim 1 further including:

(a) a set of rectangular flash cards wherein each flash card includes combinations of factors for a separate numeral.

4. The kit of materials according to claim 1 further including:

(a) a computer program displaying the plies of cubical units properly manipulated for each combination of factors.

5. An apparatus for teaching multiplication facts comprising:

(a) a plurality of square plies set one behind the other; each of said plies corresponding to one of a set of consecutive whole numerals wherein each of said square plies includes a number of cubical units equal to the square of the corresponding numeral; said cubical units are arranged in rows and columns; said plies are positioned relative to one another such that an outermost edge of a first column of each of said plies is planarly aligned with respect to the outermost edge of the first column of the other plies; and (c) numeric indicia printed on an outer face of an uppermost cubical unit in each of said columns of each of said square plies such that said numeric indicia printed in each of said respective uppermost cubical units corresponds to a product of the numeral represented by said respective ply multiplied by the number corresponding to the number of columns that said column containing said cubical unit with the respective numeric indicia printed thereon is spaced away from said outermost edge of said first column; and (d) each of said plies being laterally advanceable with respect to one another such that a user may laterally advance one of said plies representing a particular numeral away from said remaining plies a number of columns equal to a number which the numeral represented by the respective ply is to be multiplied by so as to demonstratively represent a multiplication fact.

6. The apparatus as described in claim 5 wherein:
(a) said plies are supported on a planar base.

7. The apparatus as described in claim 5 wherein:
(a) visual representations of concrete objects may be selectively added to said outer face of each of said cubical units.

8. The apparatus as described in claim 5 wherein:
(a) said set of consecutive whole numerals begins with the numeral one.

9. The apparatus as described in claim 5 wherein:
(a) said set of consecutive whole numerals begins with the numeral one and ends with the numeral twelve.

* * * * *